United States Patent
Oroskar et al.

(10) Patent No.: US 8,855,686 B1
(45) Date of Patent: Oct. 7, 2014

(54) METHOD AND SYSTEM OF PAGING A MOBILE STATION

(75) Inventors: Siddharth S. Oroskar, Overland Park, KS (US); Sachin R. Vargantwar, Overland Park, KS (US); Deveshkumar N. Rai, Overland Park, KS (US); Manoj Shetty, Overland Park, KS (US); Ashvini G. Canjeevaram, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1725 days.

(21) Appl. No.: 12/173,681

(22) Filed: Jul. 15, 2008

(51) Int. Cl.
*H04W 64/00* (2009.01)

(52) U.S. Cl.
USPC ............................ 455/458; 455/515; 455/434

(58) Field of Classification Search
CPC .... H04W 64/00; H04W 68/08; H04W 84/027
USPC .......................................... 455/458, 515, 434
See application file for complete search history.

(56) References Cited

U.S. PATENT DOCUMENTS

| 5,590,398 | A | 12/1996 | Matthews |
| 6,745,039 | B1 | 6/2004 | Di Lalla |
| 2007/0077948 | A1 | 4/2007 | Sharma et al. |
| 2007/0249329 | A1 | 10/2007 | Zou |

FOREIGN PATENT DOCUMENTS

| WO | 2006079210 A1 | 8/2006 |
| WO | WO 2006079210 A1 * | 8/2006 |

OTHER PUBLICATIONS

Kwon et al., "Improved Paging Scheme Based on Distribution Density Information of Users in Mobile Communication Systems," IEICE Trans. Commun., vol. E86-B, No. 4, Apr. 2003.*

G.L. Lyberopoulos et al., "Intelligent Paging Strategies for Third Generation Mobile Telecommunication Systems," published in IEEE Transactions on Vehicular Technology, vol. 44, Issue 3, 543-554 (Aug. 1995).

Masakazu Shirota et al., "Performance Evaluation of a Paging Sequence Updating Scheme," Abstract, Electronics and Communications in Japan (Part I: Communications), vol. 81, Issue 6, pp. 61-60 (Dec. 7, 1998).

M. Shirota, et al., "Statistical Paging Area Selection Scheme (SPAS) for cellular mobile communication systems," Abstract, Vehicular Technology Conference, 1994 IEEE 44th, vol. 1, Issue, 8-10 pp. 367-370 (1994).

(Continued)

*Primary Examiner* — Christopher M Brandt
*Assistant Examiner* — Jing Gao

(57) ABSTRACT

A method and system of paging a mobile station. In response to receiving a request to set up a communication with a mobile station, a radio network controller (RNC) may identify a last-known location of the mobile station. The RNC may then identify two or more paging areas based on the mobile station's last-known location. In turn, the RNC may determine an indication of traffic for each of the identified paging areas. For example, the RNC may determine an indication of traffic for a paging area by (a) determining a number of communication requests received by BTSs located in the paging area within a given time period, (b) determining a number of BTSs located in the paging area, and (c) dividing the number of communication requests by the number of BTSs. Thereafter, the RNC may page the mobile station in the identified paging area having the highest indication of traffic.

20 Claims, 6 Drawing Sheets

(56) References Cited

OTHER PUBLICATIONS

Vijay Raman et al., "Performance Analysis of the Distance-Based Location Update Mechanism of CDMA 1X EV-DO," IEEE Global Telecommunications Conference (Globocom), vol. 5 Issue 28, pp. 2875-2880 (Nov. 28, 2005-Dec. 2, 2005).

Ben Liang et al., "Predictive Distance-Based Mobility Management for PCS Networks," INFOCOM '99. Eighteenth Annual Joint Conference of the IEEE Computer and Communications Societies, vol. 3, pp. 1377-1384 (Mar. 1999).

* cited by examiner

METHOD AND SYSTEM OF PAGING A MOBILE STATION

BACKGROUND

The art and popularity of wireless communications has grown significantly over recent years. Indeed, millions of people are engaging in voice and data communications using mobile stations such as cellular telephones and Personal Digital Assistants (PDAs).

In a typical cellular wireless network, an area is divided geographically into a number of cells and sectors, each defined by a radio frequency (RF) radiation pattern from a respective base transceiver station (BTS) in the cellular wireless network. Within each sector, the BTS's RF radiation pattern provides an air interface over which mobile stations may communicate with the cellular wireless network. In turn, the cellular wireless network may communicate with one or more other networks, such as the Public Switched Telephone Network (PSTN) or the Internet. As such, when a mobile station is positioned within a coverage area of the cellular wireless network (e.g., in given sector), the mobile station can communicate with entities on the other networks via the cellular wireless network.

The RF air interface of any given sector in the cellular wireless network is typically divided into a plurality of channels for carrying communications between mobile stations and the cellular wireless network. For example, the RF air interface may include a plurality of forward-link channels, such as pilot channels, sync channels, paging channels, and forward-traffic channels, for carrying communications from the cellular wireless network to the mobile stations. As another example, the RF air interface may include a plurality of reverse-link channels, such as access channels and reverse-traffic channels, for carrying communications from the mobile stations to the cellular wireless network. However, the number of channels on a given air interface, and thus the number of simultaneous communications the given air interface can support, is limited by hardware and/or protocol constraints. As such, cellular wireless networks often try to conserve the limited supply of air interface channels.

One common way a cellular wireless network conserves channels is by employing a paging process to locate idle mobile stations before assigning a traffic channel to those mobile stations. In this respect, when a given mobile station is idle, the cellular wireless network may only track the location of the mobile station at a coarse granularity (if at all), thus reducing the number of messages exchanged between the cellular wireless network and the idle mobile station. When the cellular wireless network receives a request to set up a communication with the given mobile station, the cellular wireless network may then page the given mobile station in each of a plurality of sectors, which may be selected based on a last-known location of the given mobile station. In turn, if the given mobile station is located in a given one of the plurality of sectors, the given mobile station may respond to the cellular network, and more particularly the BTS of the given sector. Accordingly, the cellular wireless network may be able to locate the given mobile station using the paging channels of the plurality of sectors, without tying up traffic channels in those sectors or maintaining constant communication with the given mobile station.

Although the paging process described above may enable the cellular wireless network to conserve its limited supply of air-interface channels while locating mobile stations, the transmission of paging messages still consumes network resources in each of the plurality of sectors in which the mobile station is paged. As such, an improved paging process would be desirable.

OVERVIEW

In one aspect, the present invention may take the form of a method for paging a mobile station. The method may include (a) identifying a last-known location of the mobile station, (b) identifying two or more paging areas based on the last-known location of the mobile station, (c) determining an indication of traffic for each of the two or more identified paging areas; and (d) paging the mobile station in the identified paging area having the highest indication of traffic. This method will preferably be carried out by a radio network controller (RNC) communicatively coupled to a plurality of base transceiver stations (BTSs). Further, in a preferred example, the method will be carried out in response to receiving a request to set up a communication with the mobile station.

In one example, the last-known location of the mobile station may include a location of a last-known BTS with which the mobile station communicated, a last-known geographic location of the mobile station, and/or a location within the last-known coverage area in which the mobile station was located.

In another example, identifying the two or more paging areas based on the last-known location of the mobile station may include identifying BTSs located in each of the two or more paging areas. In yet another example, the two or more identified paging areas may include (1) a circular area defined by a first radius from the last-known location of the mobile station, (2) a first annular area defined by the first radius and a second radius from the last-known location of the mobile station, wherein the second radius is greater than the first radius, and (3) a second annular area defined by the second radius and a third radius from the from the last-known location of the mobile station, wherein the third radius is greater than the second radius.

In still another example, determining an indication of traffic for each of the two or more identified paging areas may include, for each identified paging area, (1) determining a number of communication requests received by BTSs located in the paging area within a given time period, (2) determining a number of BTSs located in the paging area, and (3) dividing the number of communication requests by the number of BTSs.

In another example, if paging the mobile station in the identified paging area having the highest indication of traffic is unsuccessful, the method may further include paging the mobile station a second time in either (1) the identified paging area having the second-highest indication of traffic or (2) an area that consists of both the identified paging area having the highest indication of traffic and the identified paging area having the second-highest indication of traffic. In yet another example, the method may still further include continuing to page the mobile station in expanding and/or changing paging area(s) in a similar manner.

These as well as other aspects and advantages will become apparent to those of ordinary skill in the art by reading the following detailed description, with reference where appropriate to the accompanying drawings.

DETAILED DESCRIPTION

Figure 1:
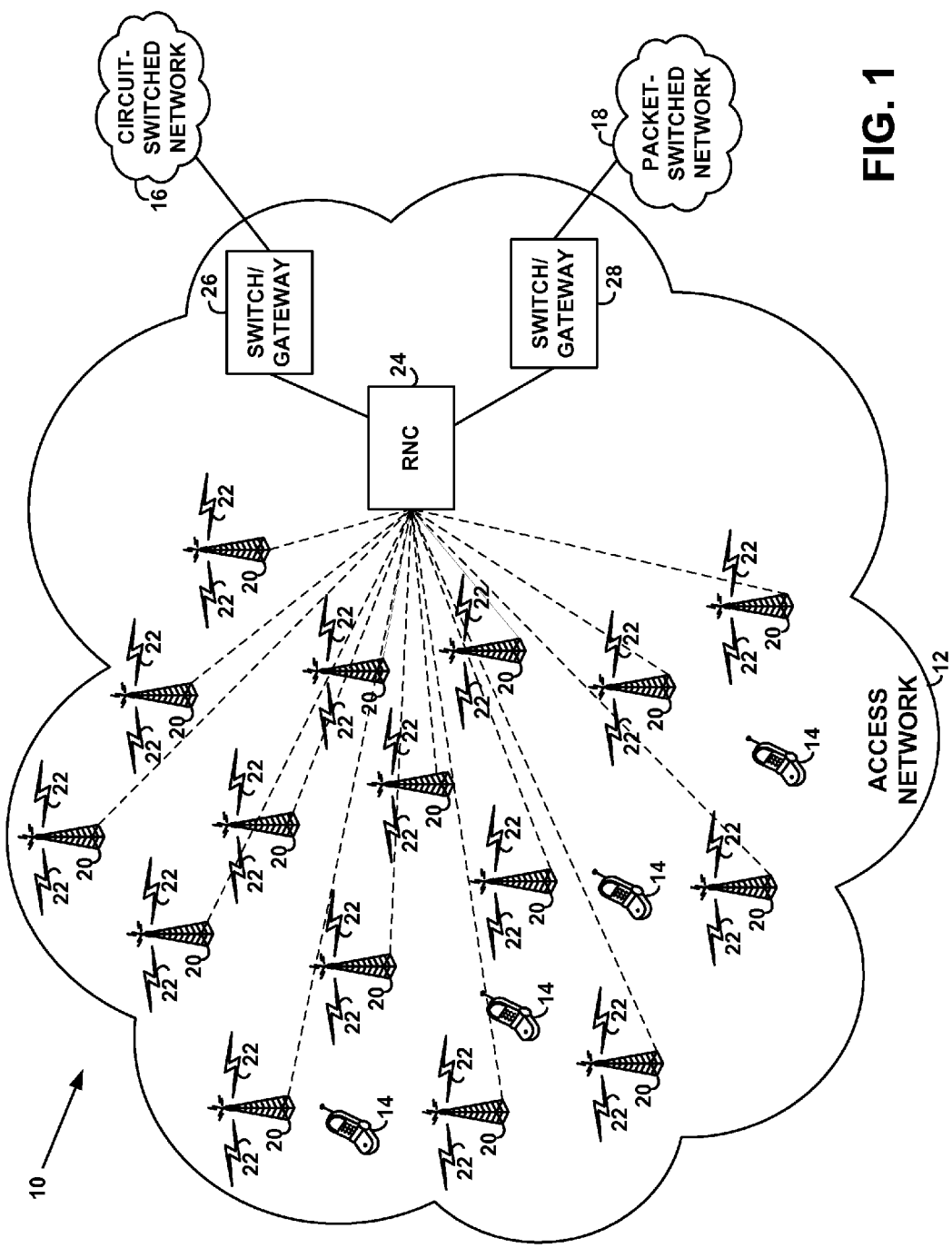
FIG. 1 is a simplified block diagram of a telecommunications system in which an exemplary embodiment of the invention can be implemented.

Referring to the drawings, FIG. 1 is a simplified block diagram of a telecommunications system 10 in which an exemplary embodiment of the invention can be implemented. As shown, the system 10 includes an access network 12, which may function to provide connectivity between one or more mobile stations 14 (e.g., cell phones, PDAs, and/or other wirelessly-equipped devices) and one or more transport networks, such as a circuit-switched network 16 (e.g., the public switched telephone network (PSTN)) or a packet-switched network 18 (e.g., the Internet).

It should be understood, however, that this and other arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic. For instance, various functions may be carried out by a processor executing a set of machine-language instructions stored in memory.

As shown, the access network 12 may include a plurality of base transceiver stations (BTSs) 20 located throughout a geographical area. Each BTS 20 may transmit RF-radiation patterns that provide one or more air interfaces 22 through which the mobile stations 14 may communicate with the access network 12. For example, each BTS 20 may transmit omnidirectional RF-radiation patterns that provide a single air interface 22. Alternatively, each BTS 20 may transmit directional RF-radiation patterns that provide multiple air interfaces 22.

Each of the one or more air interfaces 22 of a given BTS 20 may define a corresponding wireless coverage area of the given BTS 20. For example, if the given BTS 20 radiates to provide a single air interface 22, then the given BTS 20 may serve a single wireless coverage area (e.g., a cell). Alternatively, if the given BTS 20 radiates to provide multiple air interfaces 22, the given BTS 20 may serve multiple wireless coverage areas (e.g., sectors). In either case, the one or more air interfaces 22 and corresponding wireless coverage areas may be identified by an identifier of the given BTS, one or more carrier frequencies of the given BTS, and/or a pseudo-random number (PN) offset that distinguishes one wireless coverage area of the given BTS 20 from another. The coverage areas of the BTSs 20 may collectively define the coverage area of the access network 12.

The air interfaces 22 may carry communications according to any of a variety of protocols. For example, the air interfaces 22 may carry communications according to CDMA (e.g., 1xRTT, IS-856), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, and other protocols now known or later developed. Depending on the protocol employed, the air interfaces 22 may also be divided into a plurality of channels. For example, each air interface 22 may include forward-link channels, such as pilot channels, sync channels, paging channels, and/or forward-traffic channels, for carrying forward-link communications from the access network 12 to the mobile stations 14. As another example, each air interface 22 may include reverse-link channels, such as access channels and reverse-traffic channels, for carrying reverse-link communications from the mobile stations 14 to the access network 12.

Each BTS 20 of the access network 12 may then couple to a radio network controller (RNC) 24 (also known as a base station controller (BSC)), which may function to communicate with each BTS 20 and control aspects of the BTSs 20 as well as aspects of the air-interface communication with the mobile stations 14. (Although FIG. 1 depicts the access network 12 as including a single RNC 24 that couples to all BTSs 20, it should be understood that the access network 12 may include a plurality of RNCs 24 coupled together, in which case each RNC 24 may couple to a subset of the BTSs 20). As one example, the RNC 24 may control assignment of air-interface traffic channels to mobile stations 14. As another example, the RNC 24 may control aspects of a given mobile station 14 switching between coverage areas of the access network 12. As yet another example, the RNC 24 may facilitate communications between BTSs 20. Many other examples are possible as well.

The RNC 24 may then couple to a switch/gateway 26, such as a mobile switching center (MSC), which may provide connectivity with the circuit-switched network 16. Further, the RNC 24 may couple to a switch/gateway 28, such as a packet data serving node (PDSN), which may provide connectivity with the packet-switched network 18. In this respect, the RNC 24 may additionally include a packet control function ("PCF") for controlling packet-data communications. Accordingly, with this general arrangement, the access network 12 may facilitate communications between two mobile stations 14 operating in the access network's market area, as well as communications between (a) one or more mobile stations 14 operating in one of the access network's coverage areas and (b) the circuit-switched network 16 and/or the packet-switched network 18.

As described above, the access network 12 will preferably employ a paging process to locate a given mobile station 14 before assigning a traffic channel to the given mobile station 14. In this respect, when a given mobile station 14 is idle, the access network 12 may only track the location of the given mobile station 14 at a coarse granularity (if at all), thus reducing the number of messages exchanged between the access network 12 and the given mobile station 14. When the RNC 24 of the access network 12 receives a request to set up a communication with the given mobile station 14 (e.g., from another mobile station 14 on the access network 12, the circuit-switched network 16, or the packet-switched network 18), the RNC 24 may then page the given mobile station 14 in one or more coverage areas of the access network 12, such as by directing one or more BTSs 20 to page the mobile station 14. If the given mobile station 14 receives a page message while located in one of the access network's coverage areas, the given mobile station 14 may then send a page response back to the BTS 20 serving that coverage area. In turn, that BTS 20 may send the page response to the RNC 24, which may use the page response to determine the coverage area in which the given mobile station 14 is located and thus assign a traffic channel to the given mobile station 14 in that coverage area.

When paging the given mobile station 14, the RNC 24 may select the coverage areas in which to page the given mobile station 14 according to a variety of different methods. In one exemplary paging method, the RNC 24 may page the given mobile station 14 in all coverage areas of the system 10 in the first instance. This paging method, which may be referred to as "system-wide paging," may increase the paging success rate and eliminate the need for tracking the location of idle mobile stations 14, but at a cost of consuming a large amount of network resources during each page.

In another exemplary paging method, known as "zone-based paging," the RNC 24 may page the mobile station 14 in one or more predefined zones, each of which consists of a preselected subset of the access network's coverage areas (and their serving BTSs 20). According to this paging method, an idle mobile station 14 may send a location update to the RNC 24 (via a serving BTS 20) each time the mobile station 14 enters a new zone. For example, each time an idle mobile station 14 travels to a new coverage area, the mobile station 14 may determine whether that coverage area is part of a new zone, such as by monitoring a zone identifier transmitted by the BTS 20 serving the new coverage area. If the new coverage area is part of a new zone, the mobile station 14 may then send the location update, which may include an identifier of the zone and/or an identifier of the new coverage area.

When an RNC 24 employing zone-based paging receives a request to set up a communication with a given mobile station 14, the RNC 24 may first determine a last-known zone in which the given mobile station 14 was located. Preferably, this determination will be based on a last location update the RNC 24 received from the given mobile station 14. In turn, the RNC 24 may direct the BTSs 20 located in the last-known zone to page the given mobile station 14 in the first instance. If this first page is unsuccessful, however, the RNC 24 may subsequently direct the BTSs 20 located in one or more other zones to page the given mobile station 14, such as the BTSs 20 located in zones that are adjacent to the last-known zone. If this second page is also unsuccessful, the RNC 24 may then direct all BTSs 20 in the system 10 to page the given mobile station 14.

The zone-based paging method described above may reduce the consumption of network resources if the first or second page is successful. However, because the zone-based paging method only facilitates paging the mobile station in a preselected subset of coverage areas in the first instance, the zone-based paging method may result in a first-page success rate that is less than desirable, which may in turn increase consumption of network resources and/or the call set up time. In this respect, the first-page success rate of the zone-based paging method depends heavily on both the dimensioning of the predefined zones and the last-known location of the mobile station 14. For instance, if the predefined zones are too large, certain BTSs 20 will be unnecessarily paging the given mobile station 14. Alternatively, if the predefined zones are too small, the likelihood of locating the given mobile station 14 with the first page may be lower. Similarly, if the last-known location of the mobile station 14 is located at an edge of a predefined zone, the likelihood of locating the given mobile station 14 with the first page may be lower. Moreover, the zone-based paging method may require the given mobile station 14 to send an increased number of location updates, especially when the given mobile station 14 is "ping-ponging" between two different zones.

In yet another exemplary paging method, known as "distance-based paging," the RNC 24 may page a mobile station 14 in areas defined by preselected radii from a last-known BTS 20 with which the mobile station 14 communicated. According to this paging method, an idle mobile station 14 may send a location update to the RNC 24 (via a serving BTS 20) after the mobile station 14 travels more a predefined distance from the BTS 20 with which the mobile station 14 was communicating when it last sent a location update (i.e., the last-known BTS $20_{LK}$). For example, each time the mobile station 14 travels to a new coverage area, the mobile station 14 may determine a distance between the BTS 20 serving the new coverage area (i.e., the new BTS $20_N$) and the last-known BTS $20_{LK}$. In turn, the mobile station 14 may then compare this distance to a predefined distance, which will preferably be a distance parameter that the mobile station 14 received from the last-known BTS $20_{LK}$. If the determined distance exceeds the predefined distance, the mobile station 14 may then send a location update to the RNC 24 via the new BTS $20_N$, which location update may include an indication of the new BTS's location (e.g., a latitude/longitude of the new BTS $20_N$) and an indication of a new predefined distance parameter (e.g., a distance parameter received from the new serving BTS $20_N$). In one example, this location update may take the form of an IS-856 Route Update Message, in which case the distance parameter will be an IS-856 RouteUpdateRadius parameter.

When an RNC 24 employing distance-based paging receives a request to set up a communication with a given mobile station 14, the RNC 24 may first determine a location of the last-known BTS $20_{LK}$. Preferably, this determination will be based on a last location update the RNC 24 received from the given mobile station 14. In turn, the RNC 24 may direct the BTSs 20 located within a first radius (e.g., 3 miles) from the last-known BTS's location to page the given mobile station 14. If this first page is unsuccessful, however, the RNC 24 may subsequently direct the BTSs 20 located within a second radius (e.g., 7 miles) from the last-known BTS's location to page the given mobile station 14, where the second radius is larger than the first radius. If the second page is also unsuccessful, the RNC 24 may direct the BTSs 20 located within a third radius (e.g., 10 miles or 100 miles) from the last-known BTS's location to page the given mobile station 14, where the third radius is larger than the second radius. Preferably, the first, second, and third radii will be selected based on a RouteUpdateRadius parameter in the last IS-856 Route Update Message the RNC 24 received from the given mobile station 14. (It should be understood that the RouteUpdateRadius parameter, and thus the radii, may vary depending on the particular mobile station 14 and/or its last-known $BTS_{LK}$).

The distance-based paging method may increase the paging success rate on the first or second page in comparison to zone-based paging, thus further reducing the consumption of network resources. Moreover, the distance-based paging method may reduce the number of location updates that mobile stations 14 are required to send. However, the distance-based paging method may still result in a first-page success rate that is less than desirable, which may in turn result in a higher consumption of network resources and/or an increased call set up time. This is especially the case when the mobile station 14 has moved to a location that is beyond the first radius from the last-known BTS's location, and is thus outside of the first paging area, but is still being served by a BTS 20 that is within the predefined distance from the last-known BTS 20 such that the mobile station 14 has not sent a location update.

Figure 2:
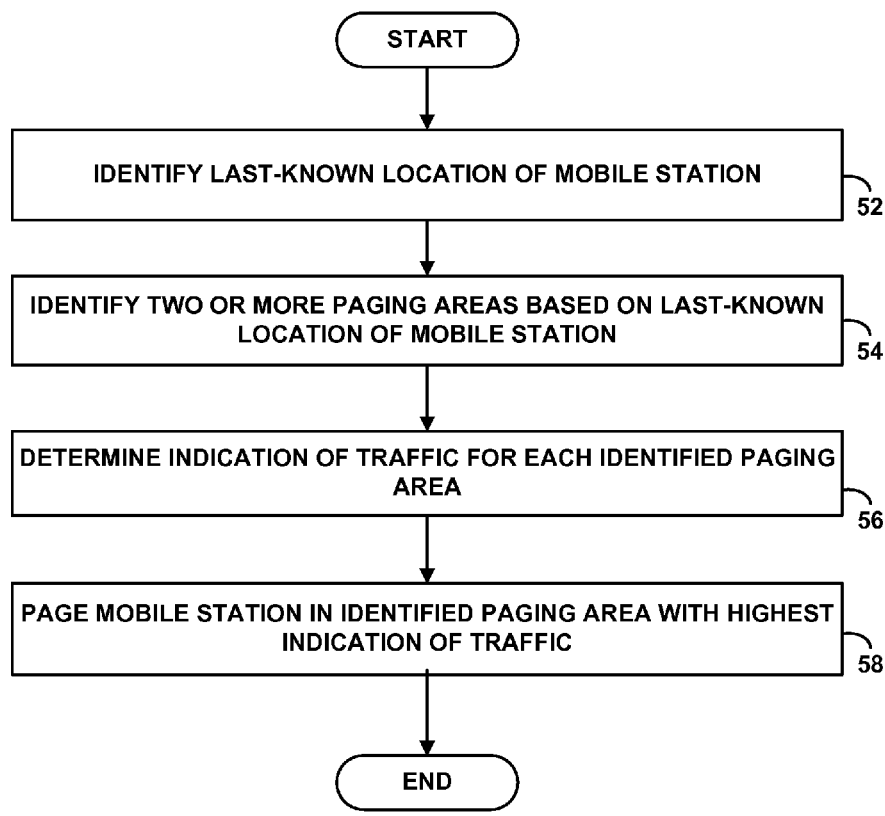
FIG. 2 is a flow chart depicting a method of paging a mobile station in the system of FIG. 1, according to an example of the present invention.

FIG. 2 is a flow chart depicting a method of paging a mobile station 14 in the system 10, according to an example of the present invention. In a preferred example, the method described herein will be carried out by the access network 12, and more particularly the RNC 24 working together with the BTSs 20. The method may be carried out in response to the RNC 24 receiving a request to set up a communication with the mobile station 14. The requested communication may be any type of communication, including a phone call, a packet-data session, and/or a short message service (SMS) message, as examples. Further, the RNC 24 may receive the request from one of various system entities. For example, the RNC 24 may receive the request from the packet-switched network 18 via the switch/gateway 28. As another example, the RNC 24 may receive the request from the circuit-switched network 16 via the switch/gateway 26. Other examples are possible as well.

At step 52, after receiving the communication request, the RNC 24 may identify a last-known location of the mobile station 14. In one example, the RNC 24 may identify the last-known location of the mobile station 14 by using an identifier of the mobile station 14 to access data indicating the mobile station's last-known location. In this respect, the RNC 24 will preferably maintain or have access to a location database that stores data indicating a last-known location of each idle mobile station 14 in the system 10, and the RNC 24 (or some other entity) may update this location database when it receives location updates from mobile stations 14. Other examples for identifying the last-known location of the mobile station 14 may exist as well, such as but not limited to position-determining technologies (e.g., GPS).

The mobile station's last-known location may take a variety of forms. In a preferred example, the mobile station's last-known location will be a location of the last-known BTS $20_{LK}$ with which the mobile station 14 communicated, such as a latitude/longitude of the last-known BTS $20_{LK}$. In this respect, the last-known BTS $20_{LK}$ will preferably be a BTS 20 identified in a last location update the RNC 24 received from the mobile station 14. In another example, the mobile station's last-known location may be the last-known geographic location of the mobile station 14, such as a last-known GPS-based location of the mobile station 14. As yet another example, the mobile station's last-known location may be some other location within the last-known coverage area in which the mobile station 14 was located, such as a latitude and longitude the last-known coverage area's centroid. Other examples are possible as well.

At step 54, the RNC 24 may identify two or more paging areas based on the last-known location of the mobile station 14. In one example, the RNC 24 may identify the paging areas by using the last-known location of the mobile station and one or more other parameters to define each paging area. In this respect, after defining the paging areas, the RNC 24 may also store data defining the paging areas, along with an indication of the mobile station's last-known location, for future reference. In another example, the RNC 24 may identify the paging areas by using the mobile station's last-known location to access pre-stored data defining paging areas for that last-known location (i.e. predefined paging areas). In this respect, the RNC 24 may maintain or have access to a paging-areas database that stores the data defining the predefined paging areas for each possible last-known location of the mobile stations 14. Other examples are possible as well.

The paging areas themselves may take a variety of forms. Preferably, the paging areas will be contiguous areas. Further, the total area covered by the contiguous paging areas for a given last-known location of a mobile station 14 will preferably encompass the mobile station's last-known location, such that the mobile station's last-known location may be at or near the center of that total area. The quantity and dimensions of the paging areas for each of the mobile station's possible last-known locations may then vary widely depending on the implementation of the present invention.

Figure 3:
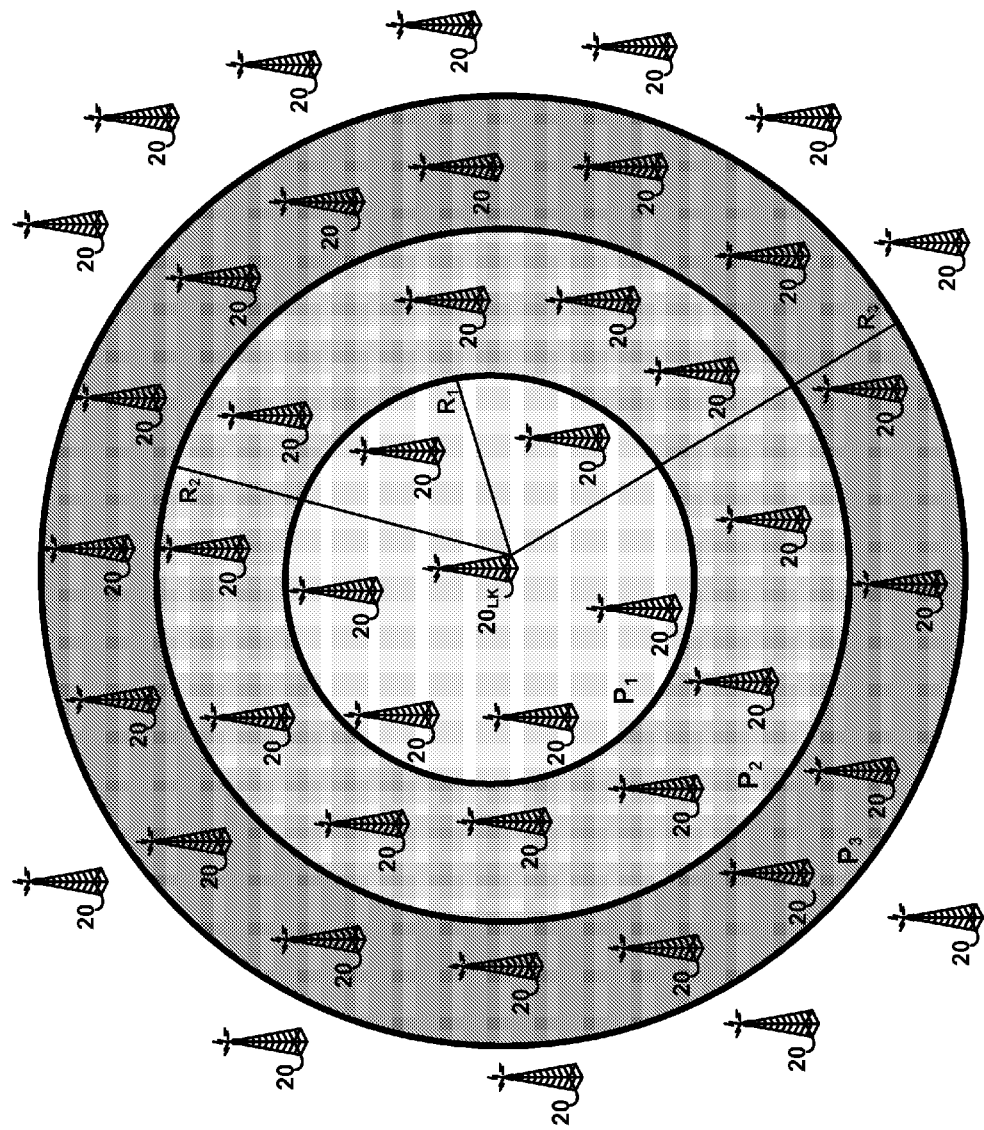
FIGS. 3-5 depict exemplary paging areas that a radio network controller (RNC) of FIG. 1 may identify based on a given last-known location of a mobile station.
Figure 4:
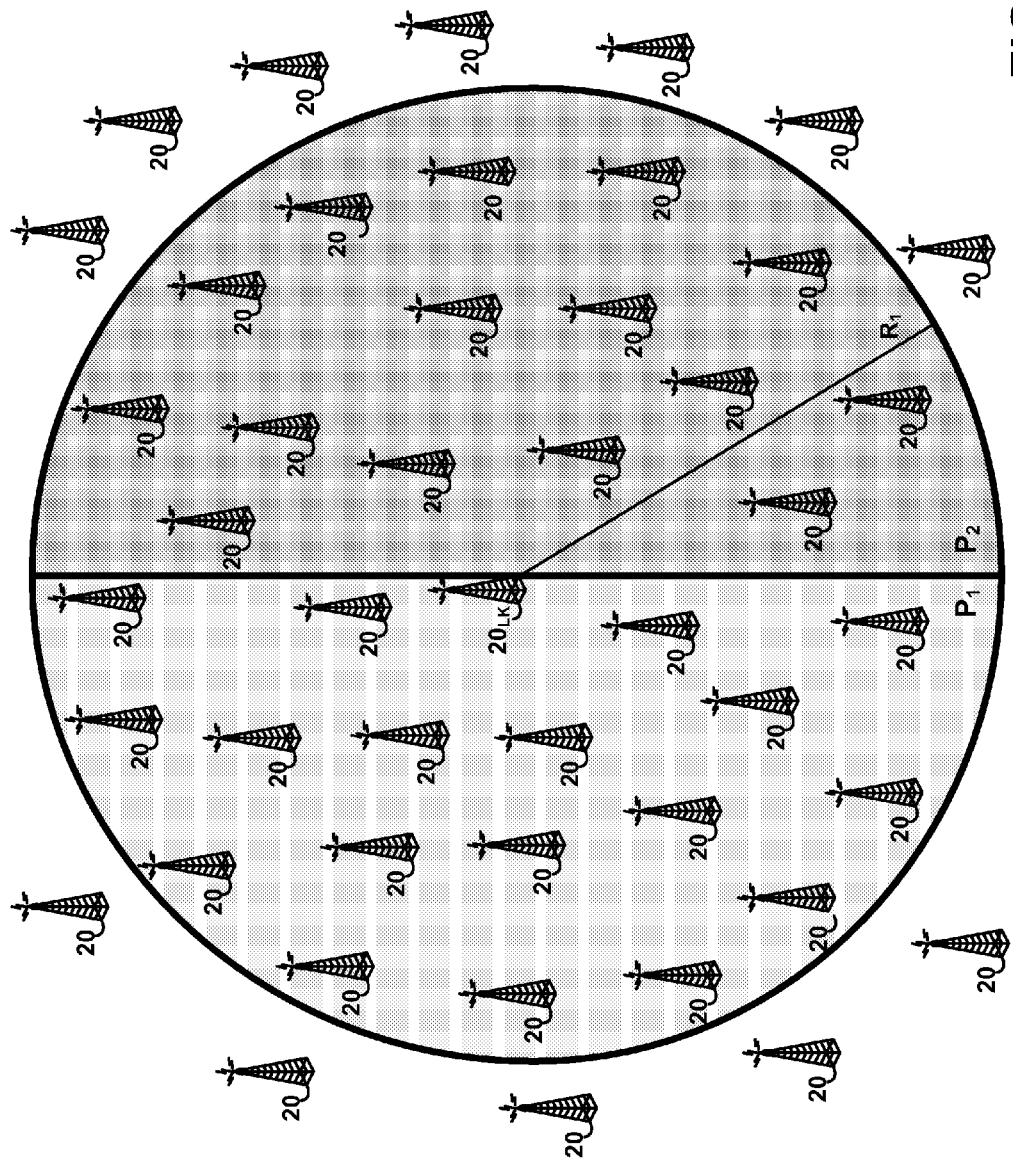
Figure 5:
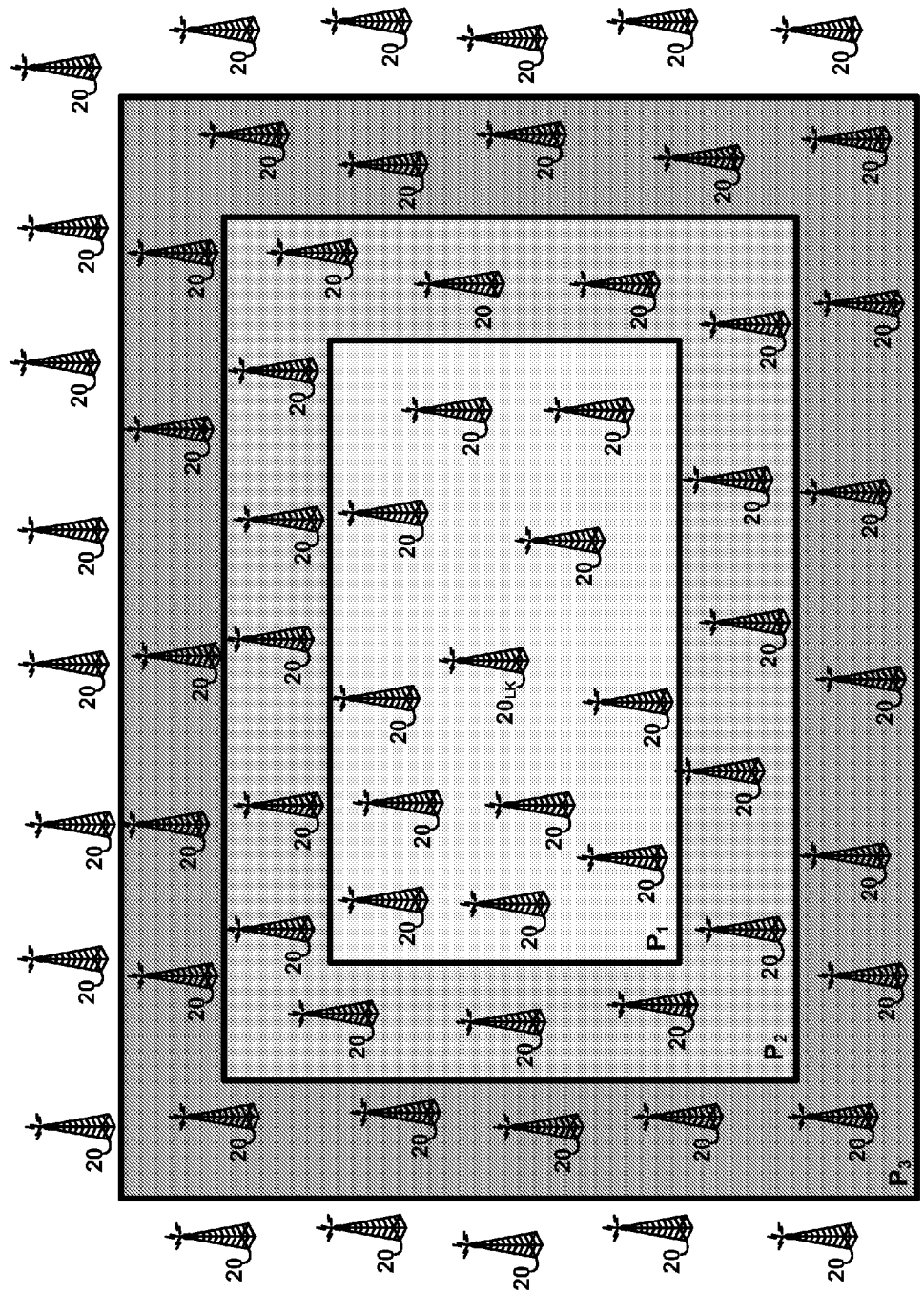

FIGS. 3-5 depict exemplary paging areas that the RNC 24 may identify based on a given last-known location of the mobile station 14. In a preferred example, as shown in FIG. 3, the paging areas for the given last-known location may take the form of (a) a circular area defined by a first radius $R_1$ from the given last-known location (i.e., the first paging area $P_1$), (b) a first annular area defined by the first radius $R_1$ and a second radius $R_2$ from the given last-known location, where the second radius $R_2$ is greater than the first radius $R_1$ (i.e., the second paging area $P_2$), and (c) a second annular area defined by the second radius $R_2$ and a third radius $R_3$ from the from the given last-known location, where the third radius $R_3$ is greater than the second radius $R_2$ (i.e., the third paging area $P_3$). In this respect, as shown, the total area covered by the three paging areas will be a circular area that encompasses the mobile station's last-known location, which will preferably be a location of the last-known BTS $20_{LK}$. Further, the first, second, and third radii that define the paging areas will preferably be based on a distance parameter that the RNC 24 received from the mobile station 14 in a last location update message, such as a RouteUpdateRadius in an IS-856 Route Update Message. For example, the first radius $R_1$ may be approximately ⅓ of the received distance parameter, the second radius $R_2$ may be approximately ⅔ of the received distance parameter, and the third radius $R_3$ may be the received distance parameter itself (As described above, the distance parameter, and thus the radii, may vary depending on the particular mobile station 14 and/or its last-known BTS$_{LK}$).

In another example, as shown in FIG. 4, the paging areas may take the form of a first semi-circular area (i.e., the first paging area $P_1$) and a second semi-circular area (i.e., the second paging area $P_2$), where the total circular area is defined by a first radius from the given last-known location of the mobile station 14. In still another example, as shown in FIG. 5, the paging areas may take the form of (a) a rectangular area surrounding the given last-known location of the mobile station 14 (i.e., the first paging area $P_1$), (b) a first rectangular ring area surrounding the rectangular area (i.e., the second paging area $P_2$), and (c) a second rectangular ring area surrounding the first rectangular ring area (i.e., the third paging area $P_3$). Many other examples of paging areas may exist as well.

Referring back to FIG. 2, in one aspect, the RNC 24 may identify paging areas in the same quantity and dimensions, independent of the mobile station's last-known location. For instance, the RNC 24 may identify one circular paging area and two surrounding annular paging areas for the mobile station's last-known location, regardless of where that last-known location falls within the access network's coverage area. In another aspect, the RNC 24 may identify paging areas in different quantities and dimensions depending on where the mobile station's last-known location falls within the access network's coverage area. For instance, if the mobile station's last-known location is in a first zone of the access network's coverage area, the RNC 24 may identify one circular paging area and two surrounding annular paging areas, whereas if the mobile station's last-known location is in a second zone of the access network's coverage area, the RNC 24 may identify two semi-circular paging areas. In this respect, the paging area database described above may include data indicating the different quantities and dimensions of paging areas for various possible last-known locations of the mobile stations 14.

While identifying the paging areas based on the mobile station's last-known location, the RNC 24 will preferably also identify the BTSs 20 located in each of the identified paging areas. In one aspect, the RNC 24 may identify the BTSs 20 by determining which BTSs 20 are located in each of the identified paging areas based on the mobile station's last-known location, the data defining the identified paging areas for the mobile station's last-known location, and/or locations of the BTSs 20 in the system 10. In this respect, the RNC 24 will preferably maintain or have access to a BTS database that stores data indicating the locations of the BTSs 20 in the system 10. For example, referring to the paging areas in FIG. 3, the RNC 24 may identify the BTSs 20 by (a) determining a distance D between a given BTS's location and the mobile station's last-known location and (b) comparing the distance D to the first, second, and third radii that define the paging areas. In this respect, (a) if $D \leq R_1$, the given BTS is in the first paging area $P_1$, (b) if $R_1 < D \leq R_2$, the given BTS is in the second paging area $P_2$, (c) if $R_2 < D \leq R_3$, the given BTS 20 is in the third paging area $P_3$, and (d) if $D > R_3$, the given BTS 20 is not within the paging areas for the mobile station 14. Other examples are possible as well. After the RNC 24 determines which BTSs 20 are located in each of the identified paging areas, the RNC 24 may also store data indicating which BTSs 20 are located in each identified paging area, along with an indication of the last-known location, for future reference.

In another aspect, the RNC 24 may identify the BTSs 20 by using the mobile station's last-known location to access pre-stored data indicating which BTSs 20 are located in the predefined paging areas for that last-known location. In this respect, the RNC 24 may maintain or have access to a database that stores data indicating which BTSs 20 are located in the predefined paging areas for each possible last-known location of the mobile stations 14. For example, the paging-areas database described above may store data indicating which BTSs 20 are located in the predefined paging areas as part of the data defining the predefined paging areas for each possible last-known location of the mobile stations 14. Other examples for identifying the paging areas and the BTSs 20 within those paging areas may exist as well.

At step 56, after identifying the paging areas, the RNC 24 may determine an indication of traffic for each of the identified paging areas. In one aspect, the RNC 24 may determine the indication of traffic for an identified paging area based on a number of communication requests in the identified paging area. For example, RNC 24 may determine the indication of traffic for an identified paging area based on a number of communications requests received by the BTSs 20s in the identified paging area (e.g., origination requests from mobile stations 14 and/or paging requests from the RNC 24) within a given time period (e.g., a 30 minute window). In this respect, the RNC 24 may determine the number of communication requests in the identified paging area by using data defining the identified paging area (e.g., BTS identifiers) to access pre-stored data indicating the number of communication requests in the identified paging area. As such, the RNC 24 may maintain or have access to data indicating a number of communication requests in various coverage areas of the access network 12, such as data indicating a number of communication requests received by each BTS 20 coupled to the RNC 24.

In one example, after determining the number of communication requests in the identified paging area, the RNC 24 may simply use that number as the indication of traffic for the identified paging area. Alternatively, the RNC 24 may divide the determined number of communication requests by a total number of BTSs 20 located in the identified paging area, in which case the RNC 24 may use the resulting value as the indication of traffic for the identified coverage area. In this respect, the RNC 24 may determine the total number of BTSs 20 in the identified coverage area based on the data indicating the BTSs that are located in each identified paging area, which the RNC 24 may have previously determined and/or accessed while identifying the paging areas.

In another aspect, the RNC 24 may determine the indication of traffic for an identified paging area based on other parameters. For example, the RNC 24 may determine the indication of traffic for the identified paging area based on a number of location updates (e.g., Route Update Messages) received by the BTSs 20 located in the identified paging area. As another example, the RNC 24 may determine the indications of traffic for the identified paging area based on a number of traffic channels established with the BTSs 20 located in the identified paging area, either currently or over a given period of time. Other examples are possible as well.

At step 58, after determining an indication of traffic for each identified paging area, the RNC 24 may page the mobile station 14 in the identified paging area having the highest indication of traffic. In this respect, the RNC 24 may first compare the determined traffic indications for each identified paging area, to determine the identified paging area having the highest traffic indication. Thereafter, the RNC 24 may send a page message for receipt by the mobile station 14 via each BTS 20 located in the identified paging area having the highest traffic indication. In a preferred example, the higher traffic level in this paging area will correlate to an increased likelihood that the mobile station 14 is located in this paging area.

In one aspect, the RNC's first page of the mobile station 14 in the identified paging area having the highest traffic indication may be successful, thus enabling the RNC 24 to locate and subsequently set up a communication with the mobile station 14. Alternatively, however, the RNC's first page of the mobile station 14 in the identified paging area having the highest traffic indication may be unsuccessful, in which case the RNC 24 may page the mobile station 14 one or more additional times. In this respect, the RNC 24 will preferably page the mobile station 14 the one or more additional times in areas that are expanded and/or changed from the identified paging area having the highest indication of traffic, with the new areas being selected based on the determined indications of traffic. The RNC 24 may also eventually cease the paging process, such as when (a) the mobile station 14 is located, (b) the RNC 24 has paged the mobile station 14 in all paging areas without success, and/or (c) a timer expires.

In one example, after unsuccessfully paging the mobile station 14 in the identified paging area with the highest indication of traffic, the RNC 24 may then page the mobile station 14 a second time in an area that consists of both the identified paging area having the highest traffic indication and the identified paging area having the second-highest traffic indication. If the second page of the mobile station 14 is also unsuccessful, the RNC 24 may then page the mobile station 14 a third time in an area that consists of the identified paging areas having the first, second, and third-highest indications of traffic. The following table illustrates possible paging sequences according to this example:

| Traffic | 1st Page | 2nd Page | 3rd Page |
|---|---|---|---|
| $P_1 > P_2 > P_3$ | $P_1$ | $P_1 \& P_2$ | $P_1 \& P_2 \& P_3$ |
| $P_1 > P_3 > P_2$ | $P_1$ | $P_1 \& P_3$ | $P_1 \& P_2 \& P_3$ |
| $P_2 > P_1 > P_3$ | $P_2$ | $P_2 \& P_1$ | $P_1 \& P_2 \& P_3$ |
| $P_2 > P_3 > P_1$ | $P_2$ | $P_2 \& P_3$ | $P_1 \& P_2 \& P_3$ |
| $P_3 > P_1 > P_2$ | $P_3$ | $P_3 \& P_1$ | $P_1 \& P_2 \& P_3$ |
| $P_3 > P_2 > P_1$ | $P_3$ | $P_3 \& P_2$ | $P_1 \& P_2 \& P_3$ |

In another example, after unsuccessfully paging the mobile station 14 in the identified paging area with the highest indication of traffic, the RNC 24 may page the mobile station 14 a second time in only the identified paging area having the second-highest traffic indication of traffic. If the second page of the mobile station 14 is also unsuccessful, the RNC 24 may then page the mobile station 14 a third time in only the identified paging area having the third-highest traffic indication of traffic. The following table illustrates possible paging sequences according to this example:

| Traffic | 1st Page | 2nd Page | 3rd Page |
|---|---|---|---|
| $P_1 > P_2 > P_3$ | $P_1$ | $P_2$ | $P_3$ |
| $P_1 > P_3 > P_2$ | $P_1$ | $P_3$ | $P_2$ |
| $P_2 > P_1 > P_3$ | $P_2$ | $P_1$ | $P_3$ |
| $P_2 > P_3 > P_1$ | $P_2$ | $P_3$ | $P_1$ |
| $P_3 > P_1 > P_2$ | $P_3$ | $P_1$ | $P_2$ |
| $P_3 > P_2 > P_1$ | $P_3$ | $P_2$ | $P_1$ |

Other examples of paging sequences may exist as well.

Advantageously, the paging method according to the present invention may facilitate paging of the mobile station 14 first in paging areas with higher traffic levels, which should increase the first-page success rate in comparison to current paging methods. In turn, the paging method according to the present invention may further decrease the consumption of network resources and call set up times. Moreover, the paging method according to the present invention still maintains a reduced number of location updates that mobile stations 14 are required to send.

Figure 6:
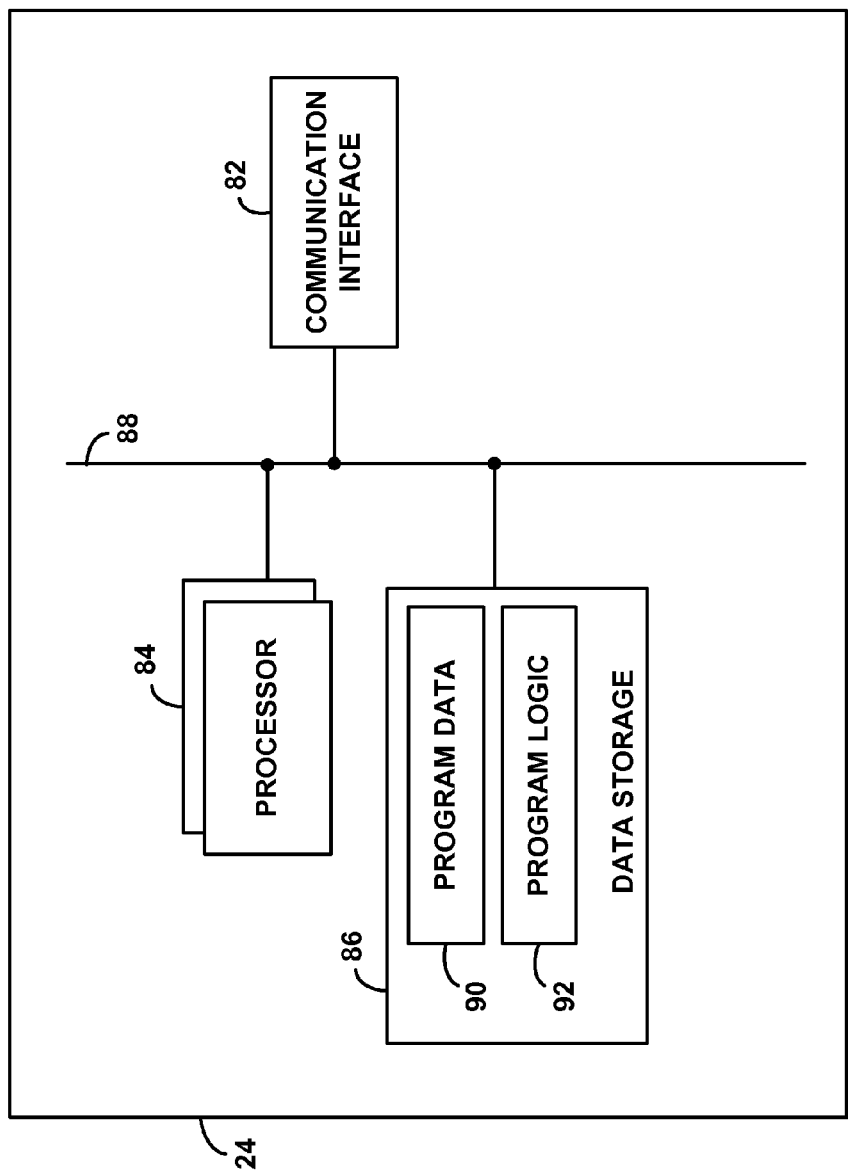
FIG. 6 is a simplified block diagram of an exemplary RNC, showing functional components that can operate to carry out aspects of the present invention.

FIG. 6 is a simplified block diagram of an exemplary RNC 24, showing functional components that can operate to carry out aspects of the present invention. As shown in FIG. 6, the RNC 24 may include a communication interface 82, a processor 84, and data storage 86, all linked together via a system bus, network, or other connection mechanism 88.

Referring to FIG. 6, the communication interface 82 preferably functions to communicatively couple the RNC 24 to other entities of the system 10, such as the BTSs 20, the circuit-switched network 16 via the switch/gateway 26, and/or the packet-switched network 18 via the switch/gateway 28. As such, the communication interface 82 may take the form of an Ethernet network interface card, a chipset and antenna adapted to facilitate wireless communication according a desired protocol, and/or any other form that provides for wired and/or wireless communication with other entities. The communication interface 82 may also include multiple communication interfaces, such as one communication interface for each entity to which the RNC 24 communicatively couples. Other configurations are also possible.

The processor 84 may comprise one or more general purpose microprocessors and/or dedicated signal processors. (The term "processor" encompasses either a single processor or multiple processors that could work in combination.) Data storage 86, in turn, may comprise memory and/or other storage components, such as optical, magnetic, organic or other memory or disk storage, which can be volatile and/or non-volatile, internal and/or external, and integrated in whole or in part with the processor 84. Data storage 86 preferably contains or is arranged to contain (i) program data 90 and (ii) program logic 92. Although these components are described herein as separate data storage elements, the elements could just as well be physically integrated together or distributed in various other ways. In a preferred example, the program data 90 could be maintained in data storage 86 separate from the program logic 92, for easy updating and reference by the program logic 92.

Program data 90 may contain information about the mobile stations 14 located in the system 10. For example, program data 90 may contain one or more identifiers for each mobile station 14 in the system (e.g., MIN, IMSI, and/or UATI). As another example, program data 90 may contain an indication of a last-known location of each mobile station 14 in the system 10, including each idle mobile station 14. In this respect, the last-known location of the mobile station 14 may be a location of the last-known BTS 20 with which the mobile station 14 was communicating, the last-known geographic location of the mobile station 14, and/or some other location within the last-known coverage area in which the mobile station 14 was located. As yet another example, program data 90 may contain other parameters that the RNC 24 may receive from the mobile stations 14 for defining the paging areas, such as a distance parameter in a location update (e.g., a RouteUpdateRadius in an IS-856 Route Update Message). Program data 90 may contain other data about the mobile stations 14 as well.

Program data 90 may also contain information about the BTSs 20 and corresponding coverage areas in the system 10. For example, program data 90 may contain one or more identifiers for each BTS 20 and its respective coverage area(s) (e.g., BSID, carrier frequency, PN offsets, etc.). As another example, program data 90 may contain an indication of a location of each BTS 20. As yet another example, program data 90 may contain an indication of a centroid or other relevant location within each coverage area. Program data 90 may contain other information about the BTSs 20 and corresponding coverage areas as well.

Program data 90 may further contain information about the predefined paging areas for each possible last-known location of the mobile stations 14 in the system 10. For example, program data 90 may contain an indication of a quantity of predefined paging areas for each possible last-known location of the mobile stations 14. As another example, program data 90 may contain data defining the predefined paging areas for each possible last-known location of the mobile stations 14, such as indications of the shape, size, and/or location of the predefined paging areas. As yet another example, program data 90 may contain one or more identifiers of the BTSs 20 located in the predefined paging areas for each possible last-known location of the mobile stations 14. Program data 90 may contain other information about the predefined paging areas as well.

Program data 90 may still further contain information about the traffic in the system 10. For example, program data 90 may contain an indication of a number of communication requests received by each BTS 20 in the system 10. As another example, program data 90 may contain an indication of a number of traffic channels assigned by each BTS 20 in the system 10. As yet another example, program data 90 may contain an indication of a number of location updates received by each BTS 20 in the system 10. Program data 90 may contain other information about the traffic in the system 10 as well.

Program logic 92 preferably comprises machine-language instructions that may be executed or interpreted by processor 84 to carry out functions according to examples of the present invention, including the functions described with reference to FIG. 2. It should be understood, however, that the program logic 92 and its associated functions are described herein by way of example only. As such, those skilled in the art will appreciate that other program logic and/or functions may be used instead, some program logic and/or functions may be added, and some program logic and/or functions may be omitted altogether. Further, the various functions described herein can be embodied in software, hardware, and/or firmware.

For example, the program logic 92 may be executable by the processor 84 to facilitate paging of a mobile station 14, according to an example of the present invention. In this respect, the program logic 92 may be executable by the processor 84 to (a) identify a last-known location of the mobile station 14, (b) identify two or more areas based on the last-known location of the mobile station 14, (c) determine an indication of traffic for each of the two or more areas, and (d) page the mobile station 14 in the identified paging area having the highest indication of traffic.

In one example, the program logic 92 may be executable by the processor 84 to carry out the above steps in response to receiving a request to set up a communication with the mobile station 14. In another example, the program logic 92 may be executable by the processor 84 to determine that the first page of the mobile station 14 is unsuccessful and responsively page the mobile station 14 a second time. In this respect, the program logic 92 may be executable by the processor 84 to page the mobile station 14 in either the identified paging area having the second-highest indication of traffic, or an area consisting of the identified paging area having the highest indication of traffic and the identified paging area having the second-highest indication of traffic.

Exemplary embodiments of the present invention have been described above. Those skilled in the art will understand, however, that changes and modifications may be made to the embodiments described without departing from the true scope and spirit of the present invention, which is defined by the claims.

We claim:

1. A method of paging a mobile station, the method comprising:
   identifying a last-known location of a mobile station;
   identifying two or more paging areas based on the last-known location of the mobile station, wherein each of the two or more paging areas comprises a group of one or more coverage areas;
   determining an indication of traffic for each of the identified two or more paging areas;
   comparing the determined indications of traffic for the identified two or more paging areas;
   based on the comparing, determining that a first paging area of the identified two or more paging areas has a highest indication of traffic relative to the other of the identified two or more paging areas; and
   initiating a first page of the mobile station in the first paging area determined to have the highest indication of traffic.

2. The method of claim 1, further comprising:
   based on the comparing, determining that a second paging area of the identified two or more paging areas has a second-highest indication of traffic relative to the other of the identified two or more paging areas; and
   if the first page of the mobile station is unsuccessful, initiating a second page of the mobile station in the second paging area determined to have the second-highest indication of traffic.

3. The method of claim 1, further comprising:
   based on the comparing, determining that a second paging area of the identified two or more paging areas has a second-highest indication of traffic relative to the other of the identified two or more paging areas; and
   if the first page of the mobile station is unsuccessful, initiating a second page of the mobile station in an area that consists of the first paging area determined to have the highest indication of traffic and the second paging area determined to have the second-highest indication of traffic.

4. The method of claim 1, wherein identifying the last-known location of the mobile station comprises using an identifier of the mobile station to access data indicating the last-known location of the mobile station.

5. The method of claim 1, wherein the last-known location of the mobile station comprises a location of a last-known base transceiver station (BTS) with which the mobile station communicated.

6. The method of claim 5, wherein the last-known BTS with which the mobile station communicated comprises a BTS identified in a last location update received from the mobile station.

7. The method of claim 1, wherein the last-known location of the mobile station comprises a last-known geographic location of the mobile station.

8. The method of claim 1, wherein the last-known location of the mobile station comprises a location within the last-known coverage area in which the mobile station was located.

9. The method of claim 1, wherein identifying the two or more paging areas based on the last-known location of the mobile station comprises using the last-known location of the mobile station and one or more other parameters to define each paging area.

10. The method of claim 1, wherein identifying the two or more paging areas based on the last-known location of the mobile station comprises using the last-known location of the mobile station to access data defining the two or more paging areas.

11. The method of claim 1, wherein identifying the two or more paging areas based on the last-known location of the mobile station comprises identifying BTSs located in each of the two or more identified paging areas.

12. The method of claim 1, wherein the identified two or more paging areas comprise:
   a circular area defined by a first radius from the last-known location of the mobile station;
   a first annular area defined by the first radius and a second radius from the last-known location of the mobile station, wherein the second radius is greater than the first radius; and
   a second annular area defined by the second radius and a third radius from the from the last-known location of the mobile station, wherein the third radius is greater than the second radius.

13. The method of claim 1, wherein determining an indication of traffic for each of the two or more identified paging areas comprises, for each identified paging area:
   determining a number of communication requests received by BTSs located in the identified paging area within a given time period;
   determining a number of BTSs located in the identified paging area; and dividing the number of communication requests by the number of BTSs.

14. The method of claim 1, wherein initiating a first page of the mobile station in the first paging area determined to have the highest indication of traffic comprises sending a page message for receipt by the mobile station via each of the BTSs located in the first paging area determined to have the highest indication of traffic.

15. The method of claim 1, carried out in response to receiving a request to set up a communication with the mobile station.

16. A method of paging a mobile station comprising:
   determining a location of a last-known base transceiver station (BTS) with which the mobile station communicated;
   identifying a first group of BTSs located in a first paging area defined by a first radius from the location of the last-known BTS;
   identifying a second group of BTSs located in a second paging area defined by the first radius and a second radius from the location of the last-known BTS, wherein the second radius is greater than the first radius;
   identifying a third group of BTSs located in a third paging area defined by the second radius and a third radius from the location of the last-known BTS, wherein the third radius is greater than the second radius;
   determining an indication of traffic for each of the identified first, second, and third paging areas;
   comparing the determined indications of traffic for the identified first, second, and third paging areas;
   based on the comparing, determining that one paging area of the identified first, second, and third paging areas has a highest indication of traffic relative to the other of the identified first, second, and third paging area; and
   initiating a first page of the mobile station in the paging area determined to have the highest indication of traffic.

17. The method of claim 16, wherein determining an indication of traffic for each of the identified first, second, and third paging comprises, for each identified paging area:
   determining a number of communication requests received by the BTSs located in the identified paging area within a given time period;
   determining a number of BTSs located in the identified paging area; and
   dividing the number of communication requests by the number of BTSs.

18. The method of claim 16, further comprising:
   based on the comparing, determining that another paging area of the identified first, second, and third paging areas has a second-highest indication of traffic relative to the other of the identified first, second, and third paging areas; and
   if the first page of the mobile station is unsuccessful, initiating a second page of the mobile station in an area that consists of the paging area determined to have the highest indication of traffic and the paging area determined to have the second-highest indication of traffic.

19. The method of claim 18, further comprising:
   if the second page of the mobile station is unsuccessful, initiating a third page of the mobile station in an area that consists of the identified first, second, and third paging areas.

20. A radio network controller (RNC) comprising:
   a communication interface coupled to a plurality of base transceiver stations (BTSs), wherein the RNC communicates with mobile stations via the communication interface and the BTSs;
   a processor;
   data storage; and
   program instructions stored in the data storage and executable by the processor for:
      identifying a last-known location of a mobile station;
      identifying two or more paging areas based on the last-known location of the mobile station, wherein each of the two or more paging areas comprises a group of one or more coverage areas;
      determining an indication of traffic for each of the two or more identified paging areas;
      comparing the determined indications of traffic for the identified two or more paging areas;
      based on the comparing, determining that a first paging area of the identified two or more paging areas has a highest indication of traffic relative to the other of the identified two or more paging areas; and
      initiating a first page of the mobile station in the first paging area determined to have the highest indication of traffic.

* * * * *